US011425228B2

(12) United States Patent
Thubert et al.

(10) Patent No.: US 11,425,228 B2
(45) Date of Patent: Aug. 23, 2022

(54) PROTOCOL INDEPENDENT SIGNAL SLOTTING AND SCHEDULING

(71) Applicant: Cisco Technology, Inc., San Jose, CA (US)

(72) Inventors: Pascal Thubert, Roquefort les Pins (FR); Eric M. Levy-Abegnoli, Valbonne (FR); Patrick Wetterwald, Mouans Sartoux (FR); Jean-Philippe Vasseur, Saint Martin d'uriage (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/823,070

(22) Filed: Mar. 18, 2020

(65) Prior Publication Data

US 2021/0297509 A1    Sep. 23, 2021

(51) Int. Cl.
*H04L 69/22* (2022.01)
*H04L 1/00* (2006.01)
(Continued)

(52) U.S. Cl.
CPC ............ *H04L 69/22* (2013.01); *H04L 1/004* (2013.01); *H04L 69/04* (2013.01); *H04W 28/06* (2013.01); *H04W 72/1221* (2013.01)

(58) Field of Classification Search
CPC ......... H04L 69/22; H04L 69/04; H04L 1/004; H04W 28/06; H04W 72/1221
See application file for complete search history.

(56) References Cited

U.S. PATENT DOCUMENTS

2005/0220110 A1* 10/2005 Agarwal ............ H04L 29/0653
370/392
2008/0262990 A1* 10/2008 Kapoor ............... H04L 63/1408
706/20
(Continued)

FOREIGN PATENT DOCUMENTS

WO    2018165113 A1    9/2018
WO    2019175378 A1    9/2019

OTHER PUBLICATIONS

Bormann et. al., "RObust Header Compression (ROHC): Framework and four profiles: RTP, UDP, ESP, and uncompressed," The Internet Society, 2001, 169 pages.
(Continued)

*Primary Examiner* — Jackie Zuniga Abad
(74) *Attorney, Agent, or Firm* — Patterson + Sheridan, LLP

(57) ABSTRACT

Protocol independent signal slotting and scheduling is provided by receiving a frame including a header and a payload for transmission; in response to determining that the frame matches a rule identifying the frame as part of a control loop, compressing the header according to the rule to produce a compressed packet of a predefined size that includes the compressed header and the payload; scheduling transmission of the compressed packet; and transmitting the compressed packet to a receiving device. In some embodiments, before compressing the frame, in response to determining that a size of the payload does not match a predefined size threshold: the payload is fragmented into a plurality of portions, wherein each portion satisfies the predefined size threshold, or the compressed packet is padded to the predefined size threshold via forward error correction padding information.

20 Claims, 6 Drawing Sheets

(51) Int. Cl.
*H04L 69/04* (2022.01)
*H04W 28/06* (2009.01)
*H04W 72/12* (2009.01)

(56) References Cited

U.S. PATENT DOCUMENTS

2020/0022022 A1* 1/2020 Ly .................. H04W 28/06
2020/0137628 A1* 4/2020 Kandasamy .......... H04L 69/169

OTHER PUBLICATIONS

Pelletier et al., "ROBust Header Compression Version 2 (ROHCv2): Profiles for RTP, UDP, IP, ESP and UPDP-Lite," Internet Society, 2008, 125 pages.

Minaburo et al., "Static Context Header Compression (SCHC) and Fragmentation for LPWAN, application to UDP/IPv6 draft-ietf-lpwan-ipv6-static-contect hc-24," Internet Society, Dec. 5, 2019, 48 pages.

Profibus International, "Profinet Real-Time Communication," 28 pages.

Khaled Q. Abdelfadeel, Victor Cionca, Dirk Pesch, "LSCHC: Layered Static Context Header Compression for LPWANS," arxiv.org, Oct. 2017, 6 pages.

Bart Moons, Abdulkadir Karaagac, Jetmir Haxhibeqiri, Eli De Poorter, Jeroen Hoebeke, "Using SCHC for an Optimized Protocol Stack in Multimodal LPWAN Solutions," biblio.urgent.be, Apr. 26, 2019, 6 pages.

Jetmire Haxhibeqiri, Eli De Poorter, Ingrid Moerman, Jeroen Hoebeke, "A Survey of Lorawan for IOT: From Technology to Application," ncbi.nlm.nih.gov, Nov. 16, 2018, 38 pages.

Brown et al., "Ultra-Reliable Low-Latency 5G for Industrial Automation," Heavy Reading Reports, 11 pages.

Huawei et al: "Discussion on the Ethernet Header Compression," 3GPP Draft, dated Nov. 12, 2018, 4 Pages.

Zhongda Tian et al: "Scheduling Method for Networked Control System with Resource Constraints based on fuzzy feedback priority and variable samoling period," Transactions of the Institute of Measurement and Control, vol. 40, No. 4, dated Feb. 1, 2018, pp. 1136-1149.

Anonymous: "draft-thubert-lpwan-schc-over-ppp-00," dated Dec. 3, 2019, pp. 1-5.

PCT Notification of Transmittal of The International Search Report and The Written Opinion of The International Searching Authority, or The Declaration for application PCT/US2021/070276 dated Jun. 7, 2021.

* cited by examiner

PROTOCOL INDEPENDENT SIGNAL SLOTTING AND SCHEDULING

TECHNICAL FIELD

Embodiments presented in this disclosure generally relate to signal processing. More specifically, embodiments disclosed herein provide for the slotting and scheduling of signals originally formatted according to various protocols or standards.

BACKGROUND

Various applications, devices, and services rely on sending and receiving signals with an expected update rate to maintain proper functionality. For example, remotely monitored and controlled equipment, semi-autonomous equipment, and autonomous equipment can send and receive signals for the control thereof via a control loop, but if status data is not sent on schedule, or action commands are not received on schedule, those systems may behave aberrantly or otherwise perform below expectations.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
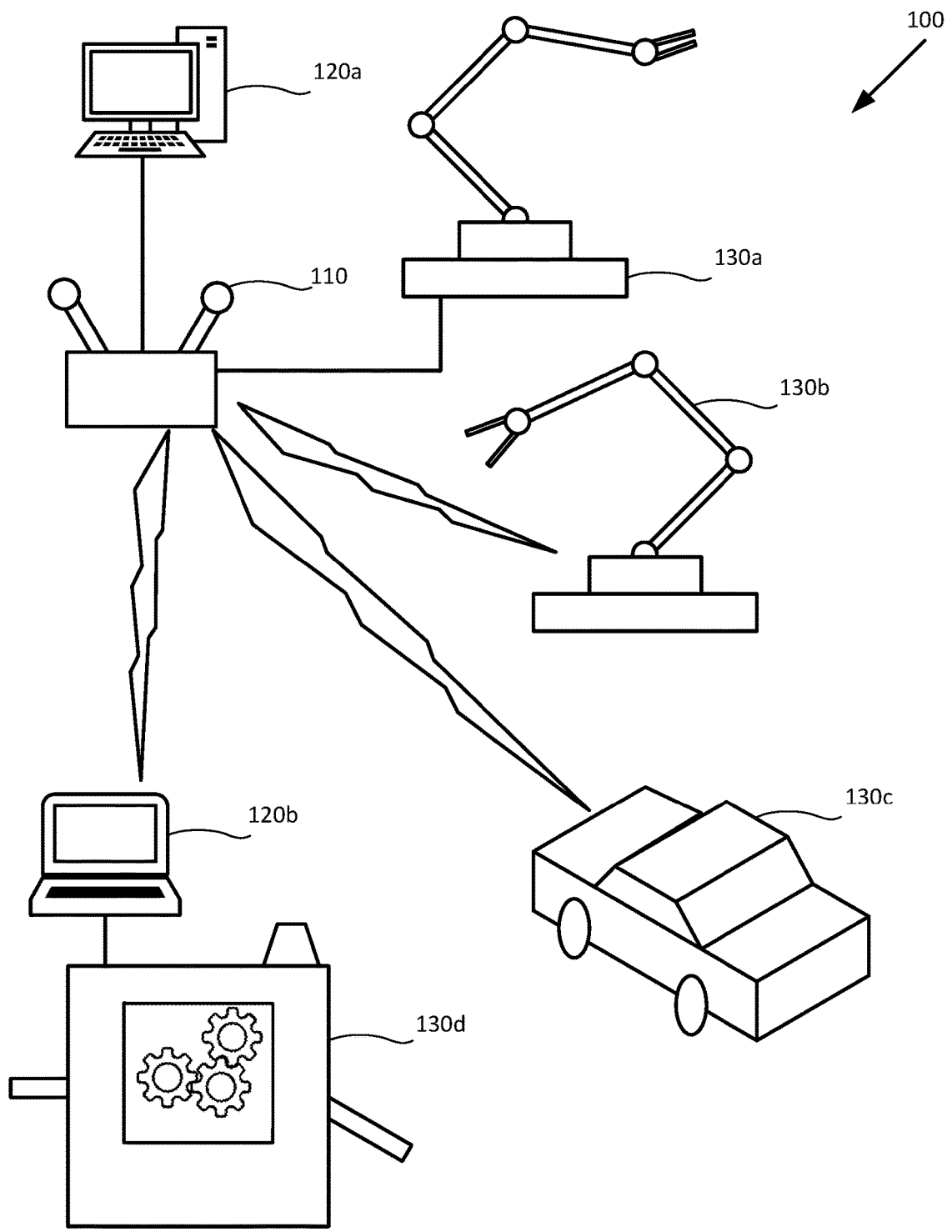
FIG. 1 illustrates an environment in which the signal slotting and scheduling is applied, according to embodiments of the present disclosure.

One embodiment presented in this disclosure is a method, including: receiving a frame including a header and a payload for transmission; in response to determining that the frame matches a rule identifying the frame as part of a control loop, compressing the header according to the rule to produce a compressed packet of a predefined size that includes the compressed header and the payload; scheduling transmission of the compressed packet; and transmitting the compressed packet to a receiving device.

One embodiment presented in this disclosure is a system, including: a network interface card and a memory storage device including instructions that when performed by the network interface card perform an operation comprising: receiving a frame including a header and a payload for transmission; in response to determining that the frame matches a rule identifying the frame as part of a control loop, compressing the header according to the rule to produce a compressed packet of a predefined size that includes the compressed header and the payload; scheduling transmission of the compressed packet; and transmitting the compressed packet to a receiving device.

One embodiment presented in this disclosure is a computer readable storage device, including: receiving a frame including a header and a payload for transmission; in response to determining that the frame matches a rule identifying the frame as part of a control loop, compressing the header according to the rule to produce a compressed packet of a predefined size that includes the compressed header and the payload; scheduling transmission of the compressed packet; and transmitting the compressed packet to a receiving device.

EXAMPLE EMBODIMENTS

To ensure that a system managed remotely by another system (e.g., via a control loop) performs to expectations, an operator typically needs to ensure that the system sends status information at a predefined rate and/or receives commands at a predefined rate. Operators can provide a dedicated transmission media (e.g., a wire or a reserved wireless channel between a controlling system and a controlled system,) or attempt various scheduling techniques over shared transmission media. However, dedicated transmission media may not be feasible in crowded or high-noise environments or when the systems are mobile, and sharing techniques are constrained when different protocols (requesting different rates and/or sizes of transmissions) are used. The present disclosure therefore provides for signal slotting and scheduling with compression and fragmentation to reduce packets to a shared size (i.e., the same size) that can be used by a controller to manage high speed control loops via a stateful compression schema (e.g., Static Context Header Compression (SCHC)). Accordingly, in some embodiments, the frames used for data transmission in a control loop are reduced in size, which improves the reliability of the control loops and enables for various formats of traffic to be scheduled in a given time slot over a shared transmission medium.

FIG. 1 illustrates an environment 100 in which the signal slotting and scheduling is applied, according to embodiments of the present disclosure. The environment 100 includes several computing devices, example hardware of which is described in greater detail in regard to FIG. 6, including a router 110, controller devices 120*a-b* (generally, control device 120), and controlled devices 130*a-d* (generally, controlled device 130).

A router 110 may include various networking devices configured to provide wired and or wireless networks to various other computing devices according to various networking standards or Radio Access Technologies (RAT) (e.g., IEEE 802.11 or "WiFi" networks, BLUETOOTH® networks, "cellular" (including various generations and subtypes thereof, such as Long Term Evolution (LTE) and Fifth Generation New Radio (5G NR)) networks, Citizens Broadband Radio Service (CBRS) networks, proprietary networks). In various embodiments, several routers 110 can operate in the environment to provide a shared network (e.g., a components of a virtual Basic Service Set (BSS)), and coordinate with one another how available bandwidth over the available wired or wireless transmission media are divided for use.

Various controller devices 120 and controlled devices 130 can be connected to one another directly (e.g., as the second controller device 120b and the fourth controlled device 130d are) or via the router 110. The data transmitted between the controller devices 120 and the controlled devices 130 can include data used in control loops related to the management and control of one or more manipulated variables in the controlled devices 140 (e.g., fluid flowrate in a pipe, position of actuators, voltage/current of an arc welder, on/off status of a light, etc.) as well as non-command loop data (i.e., data not directly related to the control of the controlled device 130, such as operating system or application updates, test results, media files, etc.).

For a command loop, the controller devices 120 receives input process values from one or more of the controlled devices 130 and sends controller outputs to the one or more controlled devices 130 to command various actions by the controlled devices 130. In various embodiments, the controller devices 120 transmit controller outputs to maintain the process values at a current set point or transmit controller outputs to adjust the process values to a new set point. The set points may be determined algorithmically or via user input, and one controller device 120 may process several set points for one or more controlled devices 130.

For example, a first controller device 120a is in wired communication with the router 110, and via the router 110, is in wired communication with a first controlled device 130a of a robotic arm and is in wireless communication with a second controlled device 130b of a robotic arm, a third controlled device 130c of an autonomous vehicle, and a second controller device 120b. The second controller device 120b, in turn, is in wired communication with a fourth controlled device 130d and in wireless communication with the router 110 (and thereby any devices connected to the router 110).

The controlled devices 130 include localized processing devices to coordinate the sending, receiving, and implementation of communications to/from the controller devices 120, sensors for recording and reporting process values, and actuators/motors/hydraulics for affecting a state specified by a set point via the controller output. In some embodiments, when the controlled device 130 has multiple manipulated variables controlled by the controller device 120, a given transmission can include one or more sensor readings for the manipulated variable(s). For example, in a controlled device 130 of a robotic arm, the position readings from sensors in several arms or joints can be included in one message to an associated controller device 120. In a further example, in a controlled device 130 of an autonomous vehicle, sensors may report values related to speed, position, orientation of various sub-components (e.g., steering system orientation), engine/motor performance levels, etc., in two or more separate communications to a controller device 120.

To properly control the controlled devices 130, in one embodiment, the control loop reports the process values to the controller devices 120 at or faster than a specified reporting rate, and receive controller outputs at or faster than a specified action rate, otherwise, the controlled device 130 may behave aberrantly based off of outdated commands. As more controlled devices 130 contend for access to a shared transmission medium, ensuring that each controlled device 130 can report the process values and receive the controller outputs at the specified rates becomes more difficult. Additionally, different subsystems of a given controlled device 130 may communicate by different protocols and/or at different specified reporting or action rates, further complicating the scheduling of transmissions over the shared transmission medium.

To aid in how wireless transmissions between the controller devices 120 and controlled devices 130 are handled, and improve the reliability of scheduling of transmissions, an operator may implement a slotting and scheduling schema, such as described in the present disclosure. By ensuring that the several controlled devices 130 in the same environment 100 send packets of the same size, the scheduling and slotting of those packets can be more reliable, thus allowing environments 100 to co-schedule devices using several different protocols (avoiding uncontrollable frame sizes).

Figure 2:
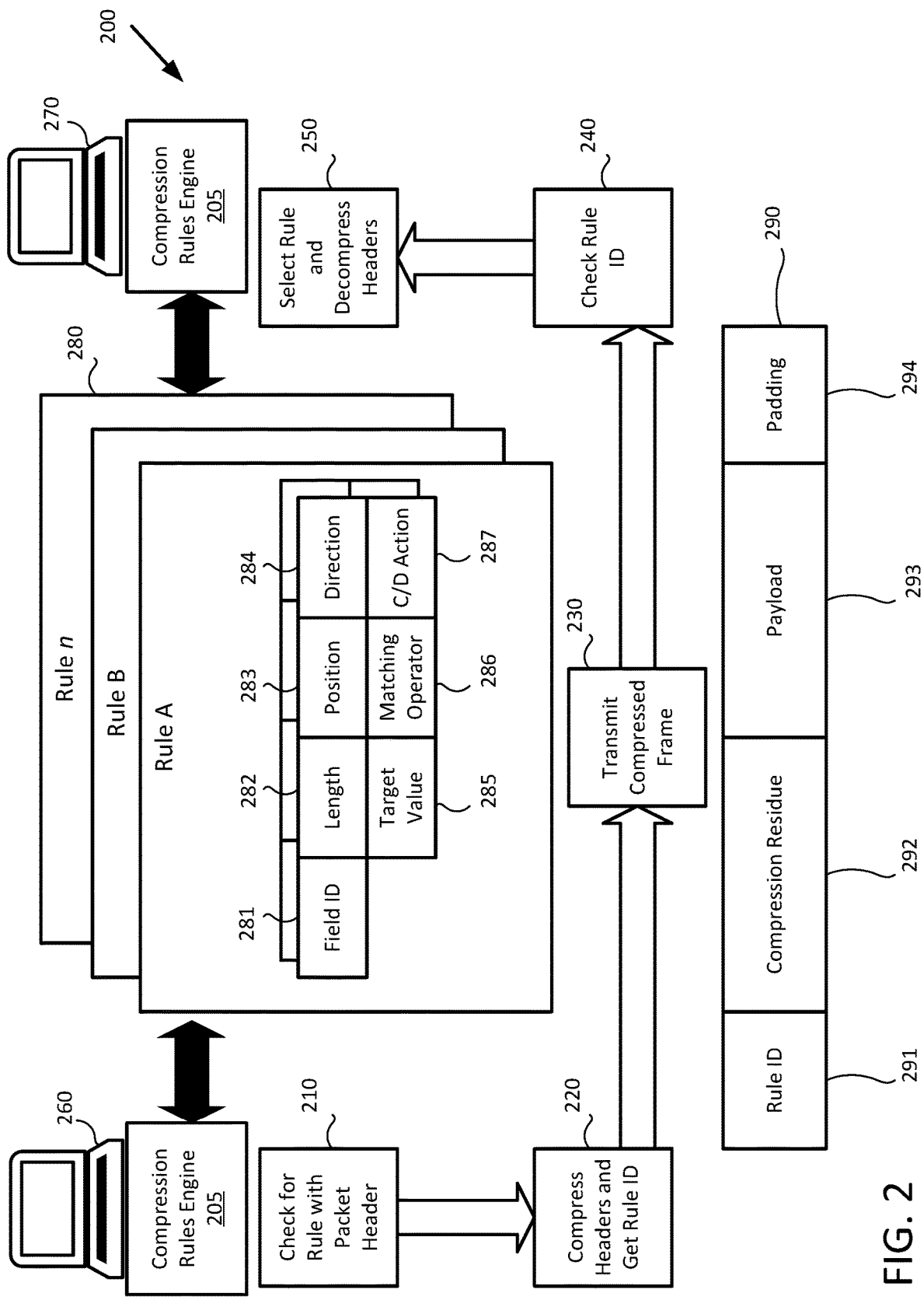
FIG. 2 illustrates an implementation flow of signal slotting and scheduling, according to embodiments of the present disclosure.

FIG. 2 illustrates an implementation flow 200 of signal slotting and scheduling, according to embodiments of the present disclosure. The flow 200 describes the transmission of data between a transmitting device 260 and a receiving device 270 (either of which may be a controller device 120, a controlled device 130 or a router 110) using a shared set of rules 280 for how to handle data transmission and reception.

Each of the transmitting device 260 and the receiving device 270 run an instance of a compression rules engine 205, which handles the compression and decompression of the compressed packets 290. The transmitting device 260 initiates transmission of the data by checking for rules 280 for the packet header for the data (per block 210) and then compresses the headers and indicates the rule ID (per block 220) in the frame, which is transmitted (per block 230) to the receiving device 270. The receiving device 270, in response to receiving the compressed packet 290, checks the rule ID (per block 240) and selects the rule 280 based on the rule ID to decompress the headers (per block 250) to use the transmitted data.

The set of rules 280 describe one or more rules 280 (e.g., rule A, rule B, . . . rule n) that provide field descriptions that are shared between the transmitting device 260 and the receiving device 270 for indicate how various packets/frames are to be handled. Within each rule 280, one or more field descriptions are described via several fields to provide a tuple that contains an identifying value with matching operators and actions to be applied to a field. A field identifier (FID) field 281 identifies the protocols and fields that a field description applies to, and contains an identifier value that matches operators and actions to be applied to various other fields described by the rule 280. A field length (FL) field 282 identifies the length of the original (non-compressed) packet header. A field position (FP) field 283 identifies, when a field is expected to appear multiple times in a header, which occurrence of the described field the field description applies to. A direction indicator (DI) field 284 tells which direction of travel (e.g., uplink, downlink, bidirectional) that a field description applies to, thereby allowing for asymmetric processing via a single rule 280 (i.e., the transmitting device 260 and the receiving device 170 are directed to apply different actions). A target value (TV) field 285 includes a value in the rule 280 that is used to match with the value of a header field. A matching operator (MO) field 286 includes an operator used to match a value contained in a header field with a value contained in a Rule. A Compression/Decompression Action (CDA) field 287 describes the pair of action that are performed (by the transmitting device 260 and the receiving device 270 respectively) that are performed at the compressor to compress a header field and at the decompressor to recover the original value of the header field.

The compressed packet 290 carries data (e.g., controller outputs or process values) at a predefined (i.e., a shared) size, which can aid in slotting and scheduling data originally formatted according to different protocols, and defines several portions with specific functions to allow for protocol independent interpretation. A rule ID potion 291 identifies the rule ID used to compress/decompress the compressed packet 290. A compression residue portion 292 includes the various values specified in the associated rule 280 used to compress the data to transmit. The rule ID portion 291 and the compression residue portion 292 collectively form the compressed header for the compressed packet 290. A payload portion 293 includes some or all of the values of the data for transmission, and an optional padding portion 294 includes padding to ensure the compressed packet 290 is the predefined size regardless of the amount of bits used in the other portions.

In a control loop, in which most of the data to be transmitted is predictable and well formatted, much of the original frame can be compressed; leaving a small subset of residual data that needs to be communicated to the receiving device 270 that can later be decompressed to reform the original frame. In various embodiments, the frame can include an IP packet in its data, or may include data formatted according to other standards (which may be classified as a packet). This consistency in compression allows for greater compression ratios, and for consistency in handling different data types when compressing/decompressing the data, and thus the size of the compressed packet 290 may be set to a predefined size that is short and consistent in length to aid in scheduling and slotting.

An additional effect of the identification and rule-based compression schema is that the compression acts as auxiliary encryption for the payload data (obfuscating the values from inspection by devices not in possession of the rules). A further benefit of the identification and rule-based compression schema is that the rules 280 act as a filter, preventing packets that do not exactly match with a known rule 280 from being sent from the transmitting device 260 to the receiving device 270 as elements of a control loop. In some embodiments, the rules 280 can be cycled or rotated so that subsequent compressed packets 290 do produce the same values in the compression residue 292 when using the same inputs. Accordingly, by varying the rules 280 selected, an operator can further obfuscate the data being transmitted (e.g., to combat eavesdropping or man-in-the-middle attacks), and do so using less bandwidth and with lower latency than by using an encryption scheme.

When the amount of compressed data to be transmitted exceeds the predefined size of the compressed packet 290, the transmitting device 260 fragments the data; splitting the transmission over two or more compressed packets 290 with portions of the data in the corresponding payload portions 293. For example, when the payload is 128 bytes in length, but the predefined size of the payload is 64 bytes, the transmitting device 260 sends two compressed packets 290; each with 64 bytes of payload. In a further example, when the payload is 65 bytes in length, but the predefined size of the payload is 64 bytes, the transmitting device 260 may send two compressed packets 290 with the payload divided between the two compressed packets 290 and with 63 bytes of padding. In various embodiments, the fragmentation and padding is formatted to minimize the number of fragments that include padding, and therefore only one compressed packet 290 (e.g., the last one) in a series of compressed packets 290 includes a padding portion 294. Continuing the example, in this scenario, the first compressed packet 290 would include 64 bytes in the payload portion 293 and exclude a padding portion 294, while a second compressed packet 290 would include 1 byte in the payload portion 293 and 63 bytes in the padding portion 294.

In various embodiments, when a padding portion 294 is included (e.g., when the size of the compressed header and the payload is below the predefined size for a compressed packet 290), the bytes used to pad the compressed packet 290 to the predefined size include Forward Error Correction (FEC) for the original frame to further augment the reliability of the compression schema. In some embodiments, when the size of the compressed header and the payload is less than half of the predefined size for the compressed packet 290, the compressed header, payload, and padding can be repeated in a single transmission opportunity (with or without interframe spacing (IFS) between instances). For example, when the predefined size for the compressed packet 290 is 64 bytes, but the compressed header and payload portion 293 occupy 28 bytes (2*28<64), the padding portion 294 is set to occupy 6 or fewer bytes. Thereby, two instances of the compressed packet 290 can be slotted and scheduled for transmission at the same time in the predefined size (e.g., 2*(28+6)=64). By sending multiple instances of the same compressed packet 290, a receiving device 270 can compare the two instances to verify proper transmission of the data and/or perform error correction between the two instances.

Figure 3:
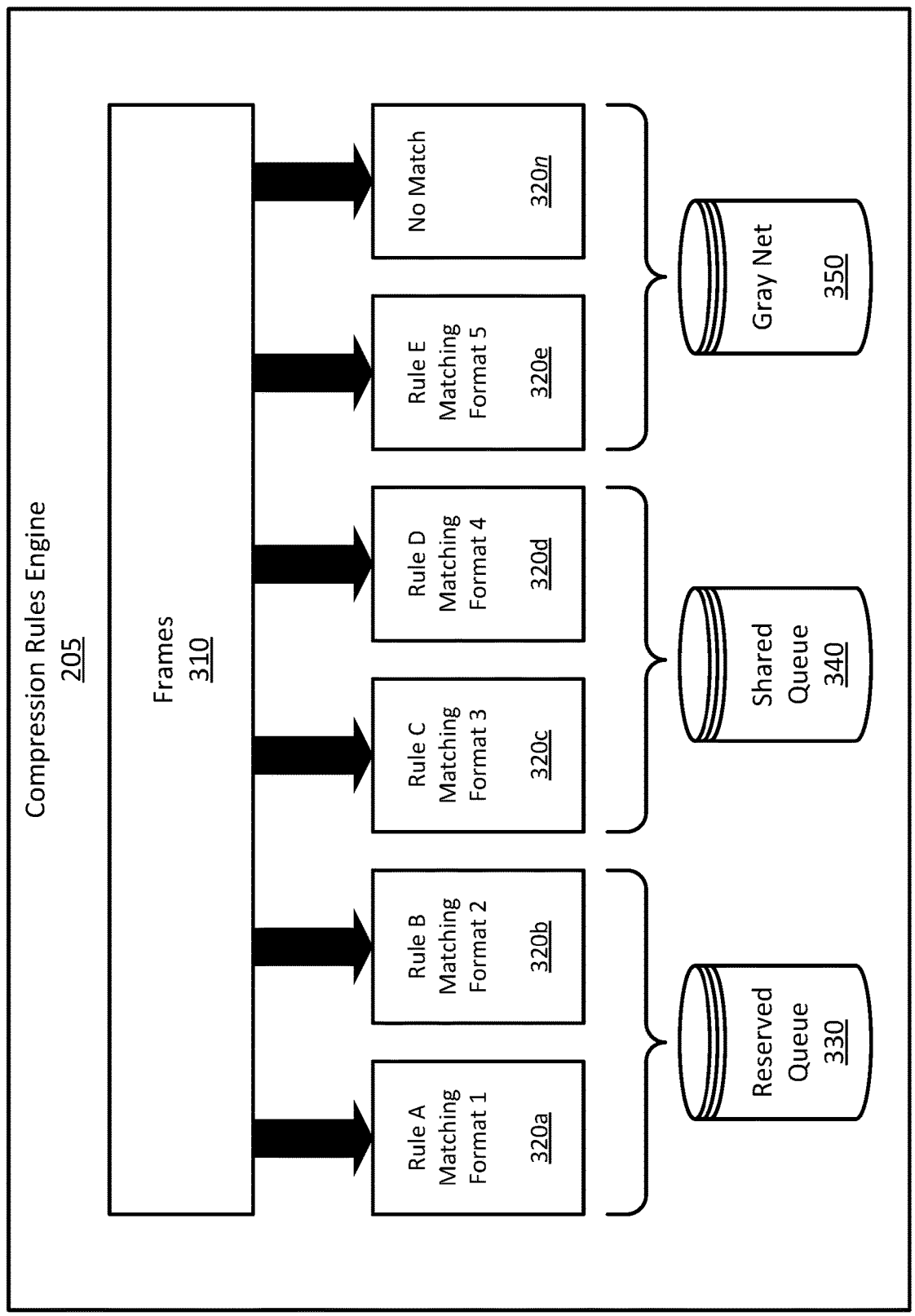
FIG. 3 illustrates frame sorting and handling, according to embodiments of the present disclosure.

FIG. 3 illustrates frame sorting and handling by a compression rules engine 205, according to embodiments of the present disclosure. A compression rules engine 205 classifies the frames that are to be transmitted and how the frames are to be compressed and queued for transmission. Additionally, the compression rules engine 205 can act as a security and formatting tool to obfuscate the data being transmitted and select frames that can be safely injection into control loops and rejected or redirect frames that are not properly formatted from injection in the control loop. For example, when receiving frames 310, the compression rules engine 205 determines whether a given frame 310 matches a given rule 280, and organizes those matching frames/rules into several buckets 320a-n (generally, bucket 320). For example, the frames 310 that match a first format are added to a first bucket 320a, the frames 310 that match a second format are added to a second bucket 320b, etc., and the frames 310 that match no formatting rule are added to an nth bucket 320n. When the compression rules engine 205 is implemented on a network interface card (NIC), the association of a packet to a flow and thus to a queue is done only if the frame 310 matches the rule. This way, even if the software on the central processing unit of the transmitting device 260 is compromised, a rogue frame cannot be injected in a deterministic resource block in a control loop.

The buckets 320 are organized for various queues for processing and/or transmission. For example, frames 310 that satisfy rule A or rule B, which are associated with control loops, are placed into the first and second buckets 320a, 320b respectively, which are both assigned to a reserved queue 330 for transmission to receiving devices 270 as compressed packets 290 according to the scheduling needs of the control loop.

Continuing the example, the frames 310 that satisfy rule C or rule D, which are not associated with control loops, are placed into the third and fourth buckets 320c, 320d respectively, which are both assigned to a shared queue 340 for transmission to receiving devices 270. The frames 310 assigned to the shared queue 340 are transmitted with deference to the frames 310 assigned to the reserved queue 330 to ensure that the control loop is given priority for transmitting at the desired rate on the specified channels.

Further in the example, frames 310 that satisfy rule E or no rule are placed into the fifth and nth buckets 320e, 320n respectively, which are both assigned to a gray net 350 for further analysis. The gray net 350 provides anomaly detection both for rogue frames 310 that do not match any known rule and for previously identified rogue frames 310. For example, the gray net 350 can identify patterns of behavior in various devices to identify repeated errors from a particular device, either to alert a human operator of unusual behaviors or to automatically correct a repeated error before reclassifying and transmitting the frame 310.

Figure 4:
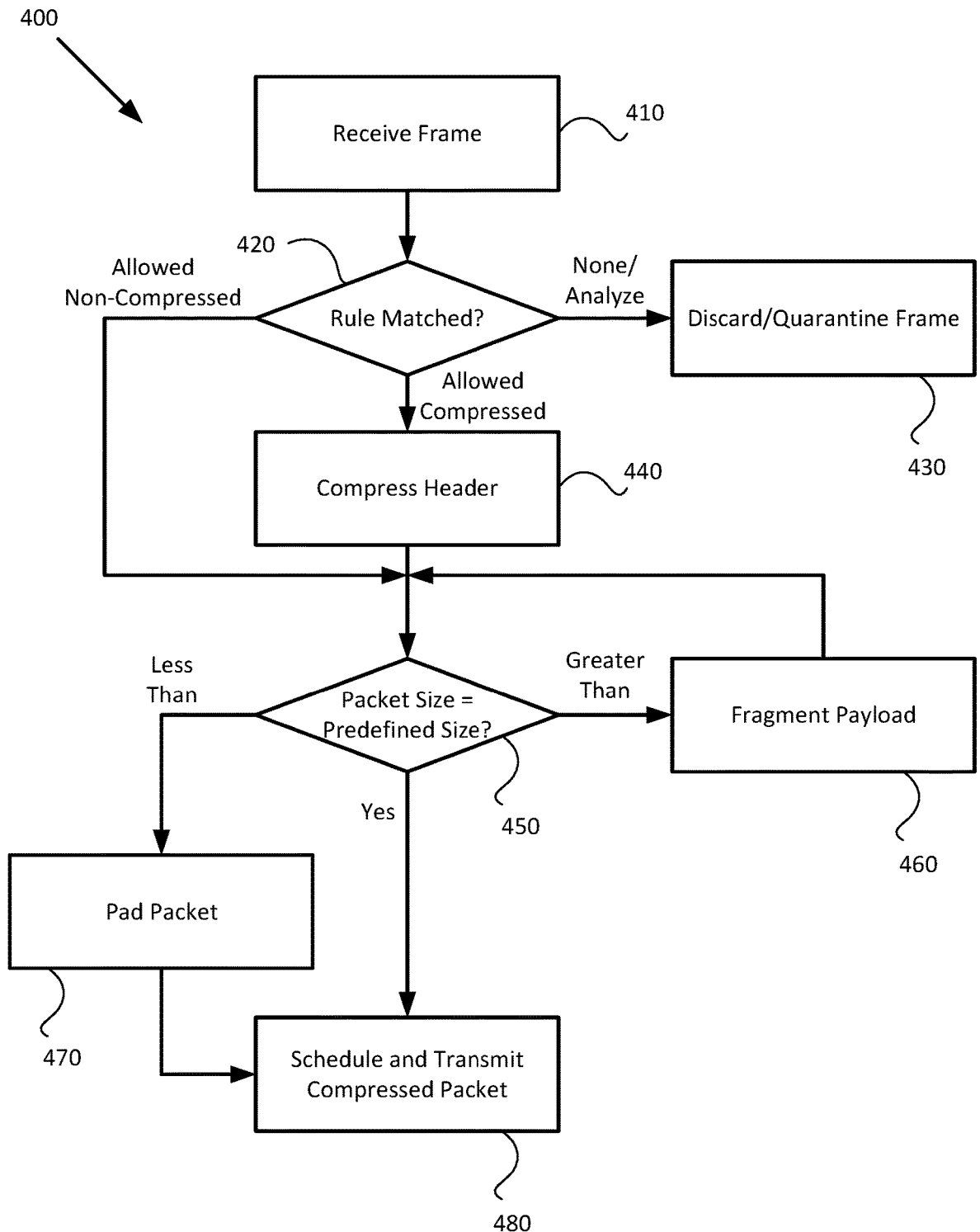
FIG. 4 is a flowchart of a method for signal slotting and scheduling, according to embodiments of the present disclosure.

FIG. 4 is a flowchart of a method 400 for signal slotting and scheduling, according to embodiments of the present disclosure. Method 400 begins with block 410, where the compression rules engine receives a frame to transmit to another device. In various embodiments, one instance of the compression rules engine resides on a NIC of the transmitting device and another instance of the compression rules engine resides on a NIC of the receiving device to automatically (and without input from application running on the CPU of the given device) process the frame according to one or more rules to filter and format the frame for slotting and scheduling in the network environment.

At block 420, the compression rules engine determines whether the received frame matches a rule in a rule set for the network environment. The frame includes a header and a payload for transmission that the compression rules engine inspects to determine what rule (e.g., the rules 280 illustrated in FIG. 2) to apply to the frame. When the frame matches no known rule in the rule set, method 400 proceeds to block 430. When the frame matches a rule specifying that further analysis or error correction is required, method 400 proceeds to block 430. When the frame matches a rule specifying that the frame is allowed for transmission as part of a control loop or other compressed data stream, method 400 proceeds to block 440. When the frame matches a rule specifying that the frame is allowed for transmission, but not as part of a compressed data stream, method 400 proceeds to block 450.

At block 430, the compression rules engine discards or quarantines the frame for analysis by a gray net. By filtering the frames to identify misformed, unknown, or corrupted data, the compression rules engine protects the downstream processes from dealing with (intentionally or unintentionally) malformed data. Method 400 may conclude at block 430 when the frame is discarded, or repeat from block 410 when the quarantined frame is reformatted.

At block 440, the compression rules engine formats the frame according to the matched rule to compress the header of the frame in the compressed packet. In various embodiments, the rule specifies data that can be removed from the header portion that a receiving device can use to reproduce the header from the compressed header when the rule is known to the receiving device. These residual data from compression are included in a compressed header for the compressed packet(s) used to transmit the data to the receiving device along with a rule identifier to identify the rule used to reproduce the header.

At block 450, the compression rules engine determines whether the amount of data to include in the compressed packet exceeds a size threshold. The data included in the compressed packet includes a rule identifier (identifying a rule used to classify and/or compress the frame), compression residue (from compressing the header information), payload data, and (optionally) padding data. When the amount of data to include in the compressed packet is greater than the targeted predefined size for the compressed packet to contain, method 400 proceeds to block 460. When the amount of data to include in the compressed packet is less than the targeted predefined size for the compressed packet to contain, method 400 proceeds to block 470. When the amount of data to include in the compressed packet is equal to the targeted predefined size for the compressed packet to contain, method 400 proceeds to block 480.

At block 460, when the payload is too large to include in a single compressed packet of the targeted predefined size, the compression rules engine fragments the payload from the frame into two or more fragments. The compression rules engine sizes the payload fragments such that, e.g., all of the compressed packets are equal to the predefined size for the compressed packet or all-but-one of the compressed packets are equal to the predefined size for the compressed packet and that the last packet is less than the predefined size. Method 400 may then return to block 450 to handle the fragmented payload.

At block 470, when the payload is not large enough to bring the compressed packet to the targeted predefined size, the compression rules engine pads the compressed packet to increase the size thereof to the predefined size. In various embodiments, the data used to pad the compressed packet include FEC padding information to aid in reconstructing the original frame. In some embodiments, where the padding would occupy half or more of the predefined size for the compressed packet, multiples instances of the compressed packet are repeated in a single transmission opportunity of the targeted predefined size. For example, when the compressed header and payload are 60 bytes in size, and the predefined size is 64 bytes, the padding is defined to occupy 4 bytes, thus bringing the size of the compressed packet to the predefined size. In a further example, when the compressed header and payload are 60 bytes in size, and the predefined size is 128 bytes, the padding can be defined to occupy 68 bytes. Alternatively, two instances of the compressed header and the payload can be included with padding sections that occupy 4 bytes (or fewer, if an IFS is defined between the instances) can be formed in the 128 bytes of the predefined size for a transmission opportunity (e.g., first header and payload, first padding, (optional) IFS, second header and payload, second padding; 60+4+60+4=128).

At block 480, the compression rules engine schedules and transmits the compressed packet(s) to the designated receiving device. Depending on the rule that the originally frame is match to (per block 420), the compression rules engine places the compressed packet into a corresponding queue for transmission. For example, the compression rules engine can inject the compressed packet into a data stream at a predefined rate used for a control loop by a controlled device or to report process variables from a controlled device to a controller device. In various embodiments, when the payload is fragmented to be transmitted via a series or compressed packets, the compression rules engine ensures that the compressed packets are sent in a known order for reconstruction and so that the fragmented data are sent within a known time frame for interpretation by the receiving device.

Figure 5:
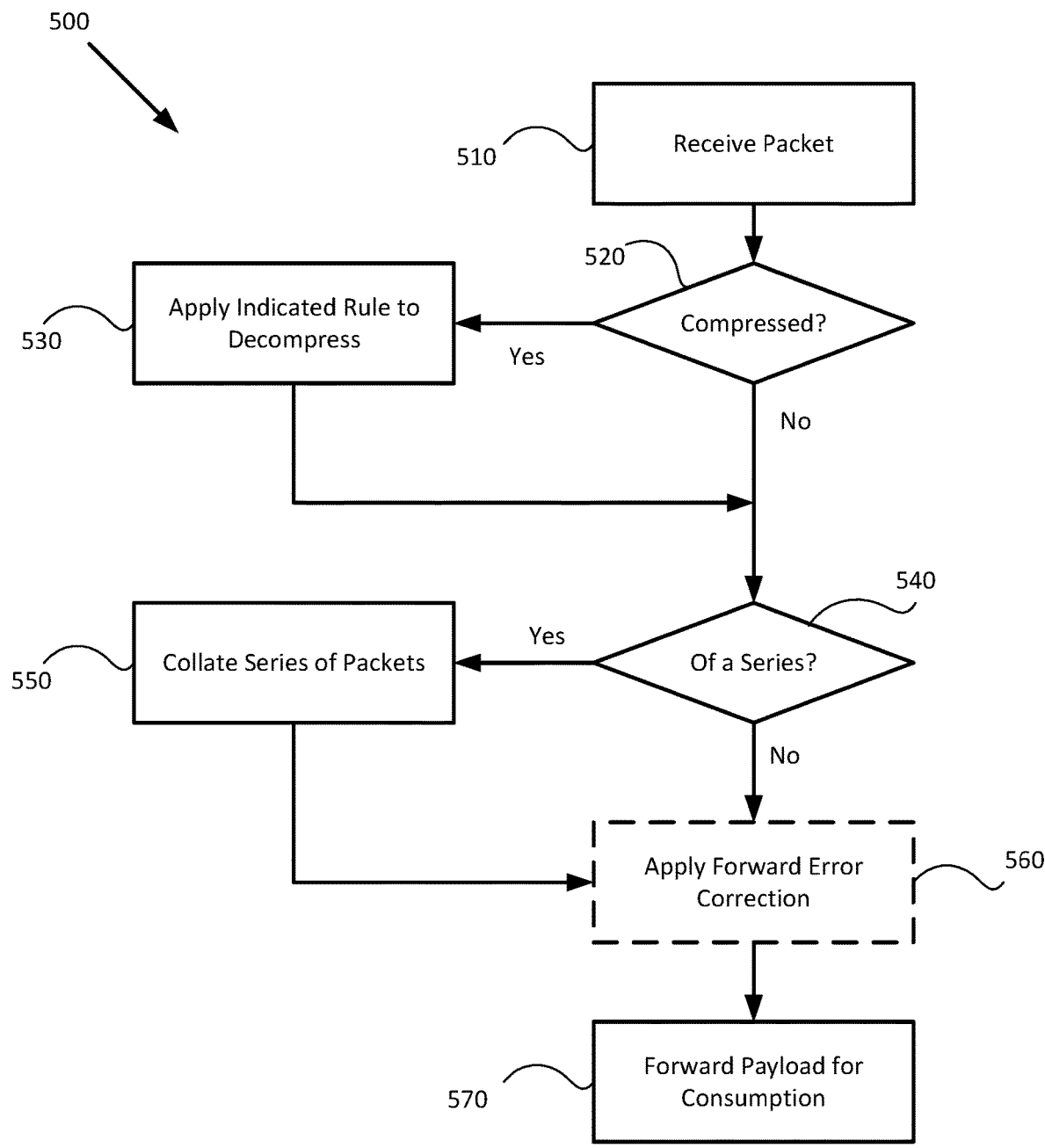
FIG. 5 is a flowchart of a method for consuming signals slotted and scheduled according to embodiments of the present disclosure.

FIG. 5 is a flowchart of a method 500 for consuming signals slotted and scheduled according to embodiments of the present disclosure. Method 500 begins with block 510, where the compression rules engine receives a packet transmitted from another device. In various embodiments, one instance of the compression rules engine resides on a NIC of the transmitting device and another instance of the compression rules engine resides on a NIC of the receiving device to automatically (and without input from application running on the CPU of the given device) process the packet (if compressed) according to one or more rules used to filter and format the original frame for slotting and scheduling in the network environment.

At block 520, the compression rules engine determines whether the received packet is compressed. In various embodiments, the packet indicates whether the packet is compressed, and how the packet was compressed, via a rule identifier in the packet header. When the rule identifier identifies that given rule was used to compress the packet, method 500 proceeds to block 530. When the rule identifier identifies that the packet is not compressed, method 500 proceeds to block 540.

At block 530, the compression rules engine applies the rule indicated in the compressed packet to decompress the compression residue in the compressed header. In various embodiments, the rule indicates the decompression action to perform, which can be the inverse of the compression action, or a different action, depending on the rule.

At block 540, the compression rules engine determines whether the packet is one of a series of fragmented packets. When the compression rules engine determines that the original frame has been fragmented (and the packet is part of a series), method 500 proceeds to block 550. When the compression rules engine determines that the original frame has not been fragmented (and the packet is not part of a series), method 500 proceeds to block 560

At block 550, the compression rules engine collates the series of packets to organize the payload according to the order of the series. The header of the packet can identify whether the payload of the original frame has been fragmented into several portions, and where a given fragment is located in relation to the other fragments in the series.

Optionally, at block 560, the compression rules engine checks the packet(s) for error correction information, and if present, applies the error correction information to the payload.

At block 570, the compression rules engine forwards the payload for consumption to an application, process, or subsystem of the receiving system.

Figure 6:
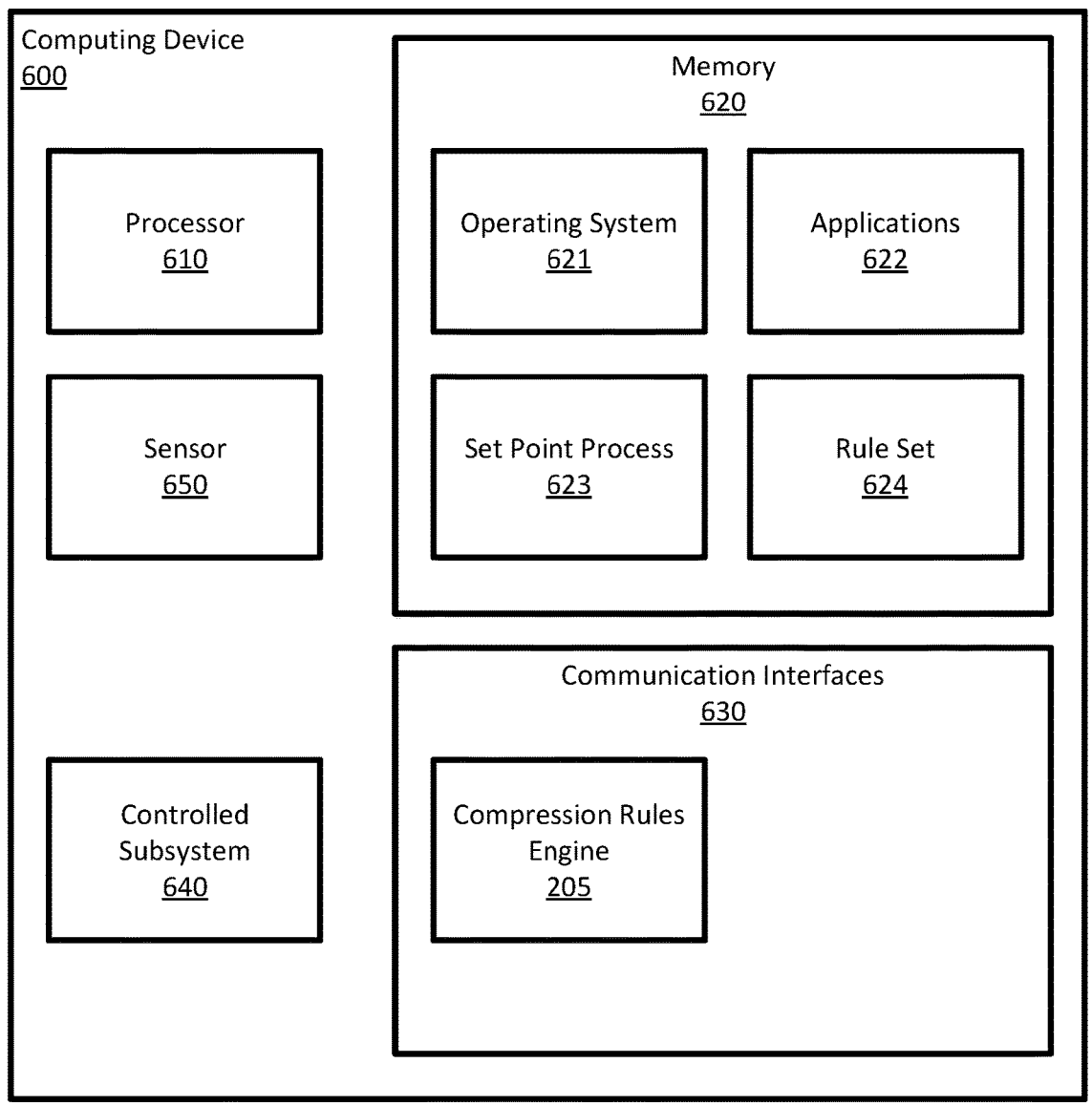
FIG. 6 illustrates hardware of a computing device, according to embodiments of the present disclosure.

FIG. 6 illustrates hardware of a computing device 600, as may be used in a router 110, controller device 120, or controlled device 130 described in the present disclosure. The computing device 600 includes a processor 610, a memory 620, and communication interfaces 630. The processor 610 may be any processing element capable of performing the functions described herein. The processor 610 represents a single processor, multiple processors, a processor with multiple cores, and combinations thereof. The communication interfaces 630 facilitate communications between the computing device 600 and other devices. The communications interfaces 630 are representative of wireless communications antennas and various wired communication ports, and may include various network interface cards that include dedicated processors for handling incoming and/or outgoing signals independently of a central processing unit of the computing device 600. The memory 620 may be either volatile or non-volatile memory and may include RAM, flash, cache, disk drives, and other computer readable memory storage devices. Although shown as a single entity, the memory 620 may be divided into different memory storage elements such as RAM and one or more hard disk drives.

When the computing device 600 is a controlled device 130, the computing device 600 includes or in in communication with one or more controlled subsystems 640 (e.g., actuators, valves, motors, indicators) and one or more sensors 650 configured to report a value of a monitored variable that the controlled subsystem 640 can affect.

As shown, the memory 620 includes various instructions that are executable by the processor 610 to provide an operating system 621 to manage various functions of the computing device 600 and one or more applications 622 to provide various functionalities to users of the computing device 600, which include one or more of the functions and functionalities described in the present disclosure. Additionally, the memory 620 includes one or more set point processes 623 to report process variables and/or determine how to command a controlled subsystem 640 of a controlled device 130 to act based on a set point for the process variable. Additionally, the memory 620 can store a rule set 624 specifying the various rules applied by the compression rules engine 205 to received frames to transmit or compressed packets to decompress and forward to an application 622 or set point process 623.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
    receiving from a transmitter device of a first system a frame including a header and a payload for transmission;
    in response to determining that the frame does not match any rules in a rule set, sending the frame to a gray net;
    receiving a corrected frame from the gray net that corrects a historically identified error present in the frame to match a rule in the rule set;
    in response to determining that the corrected frame matches a rule identifying the corrected frame as part of a control loop for the first system to control a second system and for the second system to report process values recorded by sensors included in the second system back to the first system, compressing the header according to the rule to produce a compressed packet of a predefined size that includes the compressed header and the payload;
    scheduling transmission of the compressed packet; and
    transmitting the compressed packet to a receiving device of the second system.

2. The method of claim 1, further comprising, before compressing the corrected frame, in response to determining that a size of the payload exceeds a predefined size threshold:
    fragmenting the payload into a plurality of portions, wherein each portion satisfies the predefined size threshold.

3. The method of claim 1, further comprising, before compressing the corrected frame, in response to determining that a size of the compressed header and the payload are below a predefined size threshold:
    padding the compressed packet to the predefined size threshold via forward error correction padding information.

4. The method of claim 1, wherein the compressed header indicates a rule identifier to the receiving device that identifies a decompression action to reproduce the header from the compressed header.

5. The method of claim 1, further comprising:
    receiving from a second transmitter device of a first one of a third system and a fourth system a second frame including a second header and a second payload for transmission;
    in response to determining that the second frame matches a second rule identifying the second frame as part of a second control loop for the third system to control the fourth system and for the fourth system to report process values recorded by sensors included in the fourth system back to the third system using a different communications standard than the control loop for the first system to control the second system, compressing the second header according to the second rule to produce a second compressed packet of the predefined size that includes the second compressed header and the second payload;
    scheduling transmission of the second compressed packet on a shared channel with the compressed packet; and transmitting the second compressed packet to a second receiving device of a second one of the third system and the fourth system via the shared channel.

6. The method of claim 1, further comprising:
receiving from the transmitter device a second frame including a second header and a second payload for transmission to the receiver device;
in response to determining that the second frame matches a second rule identifying the frame as not part of the control loop, compressing the header according to the second rule to produce a second compressed packet of the predefined size that includes the second compressed header and the second payload;
in response to scheduling transmission of the compressed packet, scheduling transmission of the second compressed packet in a timeslot unused by traffic for the control loop; and
transmitting, during the timeslot, the second compressed packet to the receiving device.

7. The method of claim 1, further comprising:
receiving from the transmitter device a second frame including a second header and a second payload for transmission;
in response to determining that the second frame does not match any rules in a rule set, sending the second frame to the gray net;
receiving a corrected second frame from the gray net that corrects a historically identified error present in the second frame to match the rule, compressing the second header according to the rule to produce a second compressed packet of the predefined size that includes the second compressed header and the second payload;
scheduling transmission of the second compressed packet on a shared channel with the compressed packet; and
transmitting the second compressed packet to the receiving device of one of the first system and the second system via the shared channel.

8. A system, comprising:
a network interface card; and
a memory storage device including instructions that when performed by the network interface card perform an operation comprising:
receiving from a transmitter device of a first system a frame including a header and a payload for transmission;
in response to determining that the frame does not match any rules in a rule set, sending the frame to a gray net;
receiving a corrected frame from the gray net that corrects a historically identified error present in the frame to match a rule in the rule set;
in response to determining that the corrected frame matches a rule identifying the corrected frame as part of a control loop for the first system to control a second system and for the second system to report process values recorded by sensors included in the second system back to the first system, compressing the header according to the rule to produce a compressed packet of a predefined size that includes the compressed header and the payload;
scheduling transmission of the compressed packet; and
transmitting the compressed packet to a receiving device the second system.

9. The system of claim 8, wherein the operation further comprises, before compressing the corrected frame, in response to determining that a size of the payload exceeds a predefined size threshold:
fragmenting the payload into a plurality of portions, wherein each portion satisfies the predefined size threshold.

10. The system of claim 8, wherein the operation further comprises, before compressing the corrected frame, in response to determining that a size of the compressed header and the payload are below a predefined size threshold:
padding the compressed packet to the predefined size threshold via forward error correction padding information.

11. The system of claim 8, wherein the compressed header indicates a rule identifier to the receiving device that identifies a decompression action to reproduce the header from the compressed header.

12. The system of claim 8, wherein the operation further comprises:
receiving from a second transmitter device of a first one of a third system and a fourth system a second frame including a second header and a second payload for transmission;
in response to determining that the second frame matches a second rule identifying the second frame as part of a second control loop for the third system to control the fourth system and for the fourth system to report process values recorded by sensors included in the fourth system back to the third system using a different communications standard than the control loop for the first system to control the second system, compressing the second header according to the second rule to produce a second compressed packet of the predefined size that includes the second compressed header and the second payload;
scheduling transmission of the second compressed packet on a shared channel with the compressed packet; and
transmitting the second compressed packet to a second receiving device of a second one of the third system and the fourth system via the shared channel.

13. The system of claim 8, wherein the operation further comprises:
receiving from the transmitter device a second frame including a second header and a second payload for transmission;
in response to determining that the second frame matches a second rule identifying the frame as not part of the control loop, compressing the header according to the second rule to produce a second compressed packet of the predefined size that includes the second compressed header and the second payload;
in response to scheduling transmission of the compressed packet, scheduling transmission of the second compressed packet in a timeslot unused by traffic for the control loop; and
transmitting, during the timeslot, the second compressed packet to the receiving device.

14. The system of claim 8, wherein the operation further comprises:
receiving from the transmitter device a second frame including a second header and a second payload for transmission; and
in response to determining that the second frame does not match any rules in a rule set, sending the second frame to the gray net;
receiving a corrected second frame from the gray net that corrects a historically identified error present in the second frame to match the rule;

compressing the second header according to the rule to produce a second compressed packet of the predefined size that includes the second compressed header and the second payload;
scheduling transmission of the second compressed packet on a shared channel with the compressed packet; and
transmitting the second compressed packet to the receiving device via the shared channel.

15. A computer readable storage device including instructions that when executed by a processor enable performance of an operation comprising:
    receiving from a transmitter device of a first system a frame including a header and a payload for transmission;
    in response to determining that the frame does not match any rules in a rule set, sending the frame to a gray net;
    receiving a corrected frame from the gray net that corrects a historically identified error present in the frame to match a rule in the rule set;
    in response to determining that the corrected frame matches a rule identifying the corrected frame as part of a control loop for the first system to control a second system and for the second system to report process values recorded by sensors included in the second system back to the first system, compressing the header according to the rule to produce a compressed packet of a predefined size that includes the compressed header and the payload;
    scheduling transmission of the compressed packet; and
    transmitting the compressed packet to a receiving device of the second system.

16. The computer readable storage device of claim 15, wherein the operation further comprises, before compressing the corrected frame, in response to determining that a size of the payload does not match a predefined size threshold:
    fragmenting the payload into a plurality of portions, wherein each portion satisfies the predefined size threshold; or
    padding the compressed packet to the predefined size threshold via forward error correction padding information.

17. The computer readable storage device of claim 15, wherein the compressed header indicates a rule identifier to the receiving device that identifies a decompression action to reproduce the header from the compressed header.

18. The computer readable storage device of claim 15, wherein the operation further comprises:
    receiving from a second transmitter device of a first one of a third system and a fourth system a second frame including a second header and a second payload for transmission;
    in response to determining that the second frame matches a second rule identifying the second frame as part of a second control loop for the third system to control the fourth system and for the fourth system to report process values recorded by sensors included in the fourth system back to the third system using a different communications standard than the control loop for the first system to control the second system, compressing the second header according to the second rule to produce a second compressed packet of the predefined size that includes the second compressed header and the second payload;
    scheduling transmission of the second compressed packet on a shared channel with the compressed packet; and
    transmitting the second compressed packet to a second receiving device of a second one of the third system and the fourth system via the shared channel.

19. The computer readable storage device of claim 15, wherein the operation further comprises:
    receiving from the transmitter device a second frame including a second header and a second payload for transmission;
    in response to determining that the second frame matches a second rule identifying the frame as not part of the control loop, compressing the header according to the second rule to produce a second compressed packet of the predefined size that includes the second compressed header and the second payload;
    in response to scheduling transmission of the compressed packet, scheduling transmission of the second compressed packet in a timeslot unused by traffic for the control loop; and
    transmitting, during the timeslot, the second compressed packet to the receiving device.

20. The computer readable storage device of claim 15, wherein the operation further comprises:
    receiving from the transmitter device a second frame including a second header and a second payload for transmission; and
    in response to determining that the second frame does not match any rules in a rule set, sending the second frame to the gray net;
    receiving a corrected second frame from the gray net that corrects a historically identified error present in the second frame to match the rule;
    compressing the second header according to the rule to produce a second compressed packet of the predefined size that includes the second compressed header and the second payload;
    scheduling transmission of the second compressed packet on a shared channel with the compressed packet; and
    transmitting the second compressed packet to the receiving device via the shared channel.

* * * * *

UNITED STATES PATENT AND TRADEMARK OFFICE
CERTIFICATE OF CORRECTION

| | |
|---|---|
| PATENT NO. | : 11,425,228 B2 |
| APPLICATION NO. | : 16/823070 |
| DATED | : August 23, 2022 |
| INVENTOR(S) | : Pascal Thubert et al. |

It is certified that error appears in the above-identified patent and that said Letters Patent is hereby corrected as shown below:

In the Specification

In Column 9, Line 34, delete "560" and insert -- 560. --.

In the Claims

In Column 13, Line 63, in Claim 8, delete "device" and insert -- device of --.

Signed and Sealed this
Twenty-fifth Day of October, 2022

Katherine Kelly Vidal
*Director of the United States Patent and Trademark Office*